(12) United States Patent
Yamashita et al.

(10) Patent No.: US 10,984,941 B2
(45) Date of Patent: Apr. 20, 2021

(54) INDUCTOR ELEMENT

(71) Applicant: TDK CORPORATION, Tokyo (JP)

(72) Inventors: Yasuhide Yamashita, Tokyo (JP); Katsushi Yasuhara, Tokyo (JP); Chiomi Sato, Tokyo (JP); Syota Goto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 234 days.

(21) Appl. No.: 15/968,036

(22) Filed: May 1, 2018

(65) Prior Publication Data

US 2018/0322998 A1 Nov. 8, 2018

(30) Foreign Application Priority Data

May 2, 2017 (JP) .............................. JP2017-091663

(51) Int. Cl.
*H01F 27/255* (2006.01)
*H01F 17/00* (2006.01)
*B29C 43/18* (2006.01)
*H01F 27/02* (2006.01)
*H01F 41/04* (2006.01)
(Continued)

(52) U.S. Cl.
CPC ........... *H01F 27/255* (2013.01); *B29C 43/14* (2013.01); *B29C 43/18* (2013.01); *H01F 17/04* (2013.01); *H01F 27/02* (2013.01); *H01F 41/04* (2013.01); *B29C 2043/182* (2013.01); *B29K 2705/00* (2013.01); *B29K 2995/0008* (2013.01); *B29L 2031/34* (2013.01); *H01F 1/36* (2013.01);
(Continued)

(58) Field of Classification Search
CPC ............................... H01F 27/255; H01F 17/04
See application file for complete search history.

(56) References Cited

U.S. PATENT DOCUMENTS

2004/0046626 A1* 3/2004 Nakata .................. H01F 17/043
336/83
2012/0146759 A1* 6/2012 Shibuya ................ H01F 17/043
336/221
(Continued)

FOREIGN PATENT DOCUMENTS

CN        1215494 C        8/2005
JP        2002-252120 A    9/2002
(Continued)

*Primary Examiner* — Elvin G Enad
*Assistant Examiner* — Malcolm Barnes
(74) *Attorney, Agent, or Firm* — Oliff PLC

(57) ABSTRACT

An inductor element includes a wire-winding portion and a core portion. In the wire-winding portion, a conductor is wound in a coil shape. The core portion surrounds the wire-winding portion and contains a magnetic powder and a resin. An inner-core central region is a region of the core portion within a distance from a winding axis center of the wire-winding portion toward an existing region of the wire-winding portion in an outward direction perpendicular to the winding axis center. A top-plate central region is a region of the core portion within a distance from the winding axis center toward a no-existing region of the wire-winding portion in the outward direction. $S\alpha - S\beta \geq -2\%$ is satisfied, where $S\alpha$ (%) and $S\beta$ (%) are respectively an area ratio of the magnetic powder in the inner-core central region and the top-plate central region.

8 Claims, 14 Drawing Sheets

(51) Int. Cl.
    *B29C 43/14*           (2006.01)
    *H01F 17/04*           (2006.01)
    *H01F 1/36*            (2006.01)
    *B29L 31/34*           (2006.01)
    *B29K 705/00*         (2006.01)

(52) U.S. Cl.
    CPC ...... *H01F 17/043* (2013.01); *H01F 2017/046* (2013.01); *H01F 2017/048* (2013.01)

(56) References Cited

U.S. PATENT DOCUMENTS

| | | | | |
|---|---|---|---|---|
| 2012/0274433 | A1* | 11/2012 | Matsumoto | H01F 27/292 336/192 |
| 2014/0184374 | A1* | 7/2014 | Park | H01F 17/0013 336/83 |
| 2015/0371752 | A1* | 12/2015 | Park | H01F 27/292 336/200 |
| 2016/0276088 | A1* | 9/2016 | Kwon | H01F 41/0246 |
| 2016/0343486 | A1* | 11/2016 | Kim | H01F 41/0246 |
| 2017/0301451 | A1* | 10/2017 | Kim | H01F 41/061 |
| 2018/0001523 | A1* | 1/2018 | Huang | H01F 27/29 |
| 2018/0182531 | A1* | 6/2018 | Muneuchi | H01F 27/2828 |

FOREIGN PATENT DOCUMENTS

| | | | | |
|---|---|---|---|---|
| JP | 2014082382 A | * | 5/2014 | |
| JP | 2014090158 A | * | 5/2014 | |
| JP | 2016-009858 A | | 1/2016 | |

\* cited by examiner

INDUCTOR ELEMENT

BACKGROUND OF THE INVENTION

1. Field of the Invention

The present invention relates to an inductor element.

2. Description of the Related Art

As an example of inductor elements, known is an inductor element where a coil is embedded in a core obtained by adding a resin to a metal magnetic powder and molding it with pressure.

Patent Document 1 below discloses a method of manufacturing a coil device where a magnetic powder and a thermosetting resin are mixed and molded with pressure so as to form two pressed powders, and the pressed powders are re-pressed while sandwiching a coil portion and are thermosetted. When the pressed powders are molded with the re-pressing, there are provided with a large-hardness part where the shape of the pressed powders does not collapse and a small-hardness part where the shape of the pressed powders collapses, and the pressed powders are molded while the small-hardness part is being collapsed by the re-pressing.

In the technique of Patent Document 1, however, the molding needs to be carried out by collapsing a part of the pressed powders and re-pressing it. In recent years, as the current of coil devices has been increased, DC superposition characteristics of coils need to be improved. To improve DC superposition characteristics, density needs to be increased.

In addition, since the shape of the small-hardness part collapses easily during the molding with re-pressing, a sufficient pressure transmission cannot be achieved, and the density of a part where the pressed powders are joined decreases particularly. That is, the inner part of the core tends to have a low density in an inductor element obtained finally. Furthermore, if a pressure during the re-pressing is high for increasing the density, a coil film is broken or an inner wall of a die and the surface of the magnetic powder are rubbed, and withstand voltage decreases easily.

Patent Document 1: JP 2002-252120 A

SUMMARY OF THE INVENTION

The present invention has been achieved under such circumstances. It is an object of the invention to provide an inductor element excellent in inductance and DC superposition characteristics.

To achieve the above object, an inductor element according to the present invention comprises:

a wire-winding portion where a conductor is wound in a coil shape; and a core portion surrounding the wire-winding portion and containing a magnetic powder and a resin, wherein an inner-core central region is defined as a region of the core portion within a predetermined distance from a winding axis center of the wire-winding portion toward an existing region of the wire-winding portion in an outward direction perpendicular to the winding axis center, wherein a top-plate central region is defined as a region of the core portion within a predetermined distance from the winding axis center toward a no-existing region of the wire-winding portion in the outward direction, and wherein $S\alpha - S\beta \geq -2\%$ is satisfied, where $S\alpha$ (%) is an area ratio of the magnetic powder in the inner-core central region, and $S\beta$ (%) is an area ratio of the magnetic powder in the top-plate central region, on a cross section of the inductor element passing the winding axis center and parallel thereto.

The inductor element according to the present invention has the above structure, and can thereby improve inductance and DC superposition characteristics.

Moreover, $S\alpha - S\beta \geq -1\%$ is preferably satisfied.
Moreover, $S\alpha - S\beta \geq 0\%$ is preferably satisfied.
Moreover, $S\alpha \geq 65\%$ is preferably satisfied.

DETAILED DESCRIPTION OF THE PREFERRED EMBODIMENT

Hereinafter, the present invention is described based on embodiments shown in figures, but is not limited to the following embodiments.

First Embodiment

Figure 1:
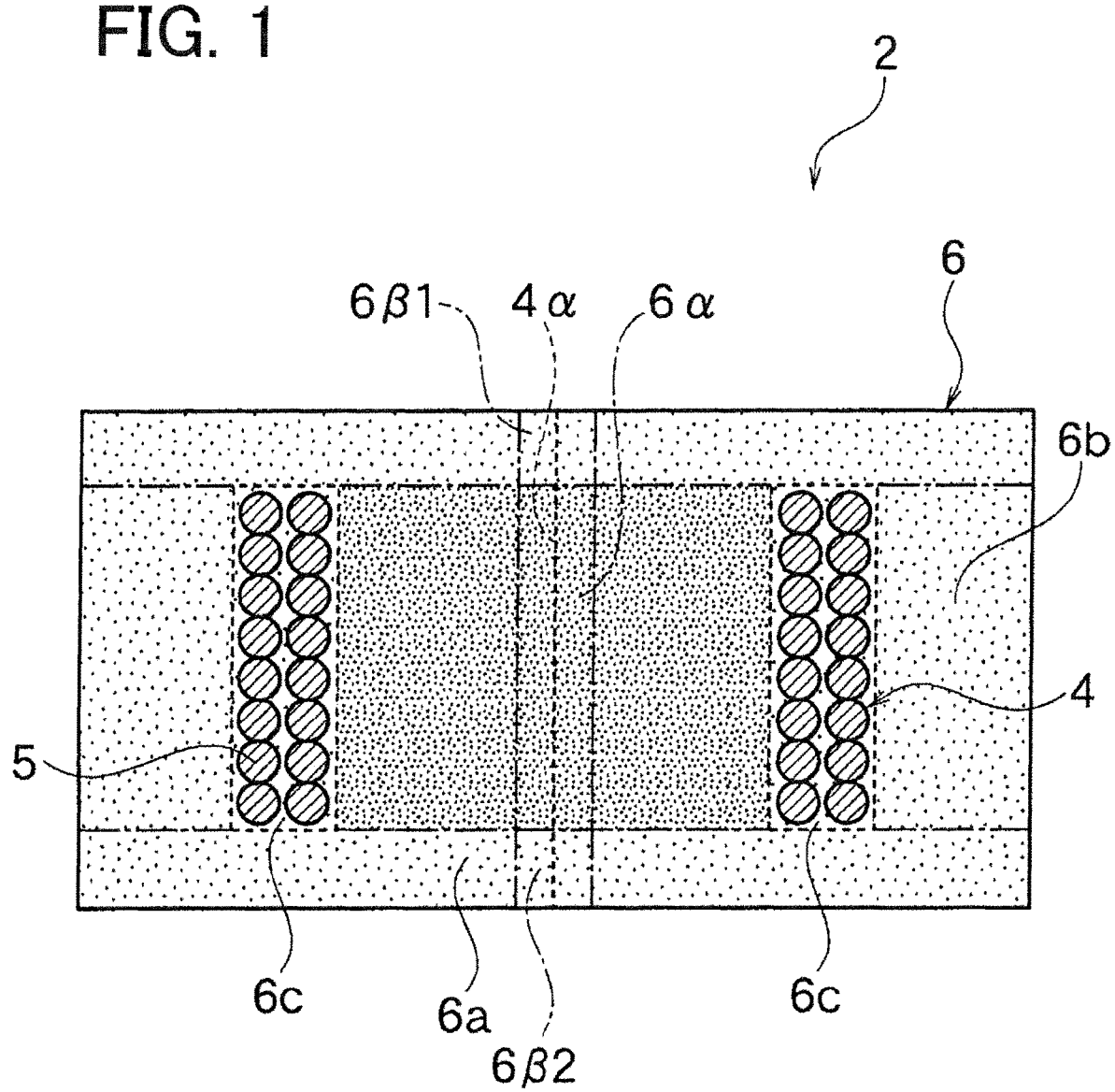
FIG. 1 is a cross-sectional view of an inductor element according to First Embodiment of the present invention.

FIG. 1 is a cross sectional view passing a winding axis center 4α of a winding-wire portion 4 mentioned below and being parallel to the winding axis center 4α. As shown in FIG. 1, an inductor element 2 according to an embodiment of the present invention includes the winding-wire portion 4 and a core portion 6. In the winding-wire portion 4, a conductor 5 is wound in a coil shape. The core portion 6 includes an inner circumferential part (also referred to as an inner core part) 6a on the inner circumferential side of the winding-wire portion 4 and an outer circumferential part 6b on the outer circumferential side of the winding-wire portion 4. A magnetic powder and a resin constituting the core portion 6 are inserted into a space 6c between the core portion 6 and the conductor 5 constituting the winding-wire portion 4.

In the inductor element 2 of the present embodiment, the top and bottom surfaces of the core portion 6 are substantially perpendicular to the Z-axis, and the side surface of the core 6 is substantially perpendicular to a plane including the X-axis and the Y-axis. The winding axis of the winding-wire portion 4 is substantially parallel to the Z-axis. The shape of the core portion 6 is not limited to the shape of FIG. 1 and may be cylinder, elliptic cylinder, etc.

The inductor element 2 of the present embodiment has any size, and for example has a size where the part excluding lead portions 5a and 5b is contained in a cuboid or cube of (2 to 17) mm×(2 to 17) mm×(1 to 7) mm. Incidentally, FIG. 1 does not illustrate the lead portions 5a or 5b of the winding-wire portion 4 shown in FIG. 2. The lead portions 5a and 5b formed on both ends of the conductor 5 constituting the winding-wire portion 4 are configured to be taken outside the core portion 6 shown in FIG. 1.

The outer circumference of the conductor (conductive wire) 5 constituting the winding-wire portion 4 is covered with an insulating film as necessary. For example, the conductor 5 is composed of Cu, Al, Fe, Ag, Au, or an alloy containing these metals. For example, the insulating film is composed of polyurethane, polyamide imide, polyimide, polyester, polyester-imide, or polyester-nylon. The conductor 5 has any transverse planar shape, such as circle, ellipse, and rectangle. In the present embodiment, the conductor 5 has a circular transverse plane.

The core portion 6 has a magnetic powder and a resin (binder). The magnetic powder is not limited, and is a ferrite of Mn—Zn, Ni—Cu—Zn, etc. or a metal of Fe—Si (iron-silicon), sendust (Fe—Si—Al; iron-silicon-aluminum), Fe—Si—Cr (iron-silicon-chromium), permalloy (Fe—Ni), etc. Preferably, the magnetic powder is Fe—Si or Fe—Si—Cr. The magnetic has any crystal structure, such as amorphous and crystalline. The resin is not limited, and is an epoxy resin, a phenol resin, a polyimide, a polyamideimide, a silicone resin, a combination thereof, or the like.

The present embodiment is characterized in that the inside of the core portion 6 has a predetermined difference in density.

As shown in FIG. 1, the core portion 6 includes an inner-core central region $6\alpha$ and top-plate central regions $6\beta1$ and $6\beta2$. The inner-core central region $6\alpha$ is defined as a region of the core portion 6 within 280 μm from the winding axis center $4\alpha$ toward an outward direction perpendicular thereto and including the winding-wire portion 4. The top-plate central regions $6\beta1$ and $6\beta2$ are respectively defined as a region within 280 from the winding axis center $4\alpha$ toward an outward direction perpendicular thereto and failing to include the winding-wire portion 4.

In the inductor element according to the present embodiment, $S\alpha-S\beta\geq-2\%$ is satisfied, where $S\alpha$ (%) is an area ratio of the magnetic powder in the inner-core central region $6\alpha$, and $S\beta$ (%) is an area ratio of the magnetic powder in the top-plate central regions $6\beta1$ and $6\beta2$. Moreover, $S\alpha-S\beta\geq-1\%$ is more preferably satisfied, $S\alpha-S\beta\geq0\%$ is still more preferably satisfied, and $S\alpha-S\beta\geq0.8\%$ is most preferably satisfied. $S\alpha-S\beta$ has no upper limit, but is normally 30% or less.

Incidentally, normally continuous is an area ratio change of the magnetic powder between the inner-core central region $6\alpha$ and the top-plate central region $6\beta$, namely, a density change of the magnetic powder. That is, unclear is a boundary between a region having a high density of the magnetic powder and a region having a low density of the magnetic powder.

In the inductor element according to the present embodiment, $S\alpha-S\beta$ is within a predetermined range, and inductance and DC superposition characteristics can thereby be improved.

In the inductor element 2 of the present embodiment, $S\alpha\geq65\%$ is preferably satisfied. The density of the magnetic powder in the inner-core central region $6\alpha$ is preferably a predetermined amount or more. When the magnetic powder has a high density, it becomes easier to prevent generation of cracks and improve inductance and DC superposition characteristics.

Figure 2:
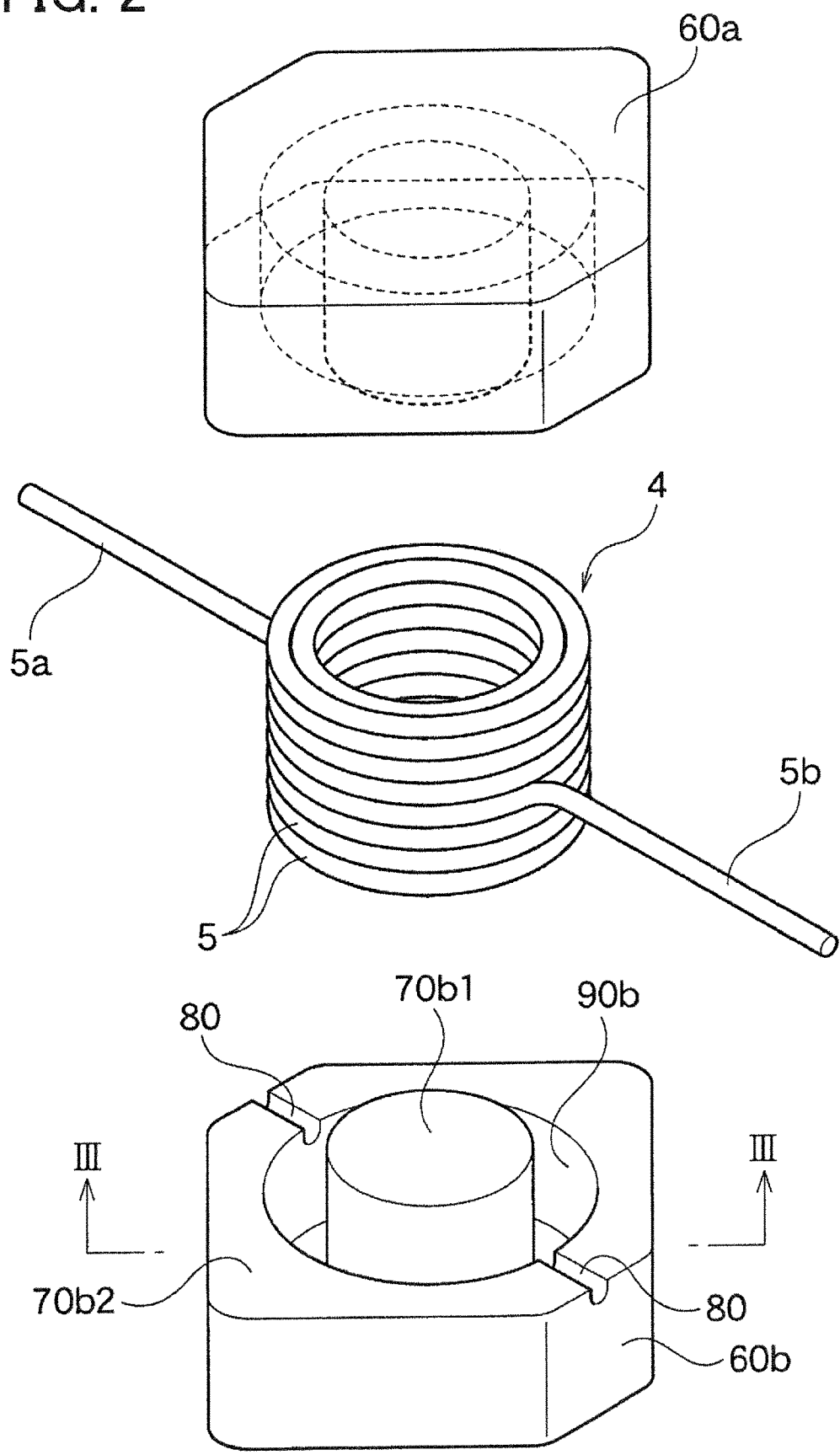
FIG. 2 is a perspective view of a preliminary green compact and an insert member used in a manufacturing process of the inductor element shown in FIG. 1.
Figure 3:
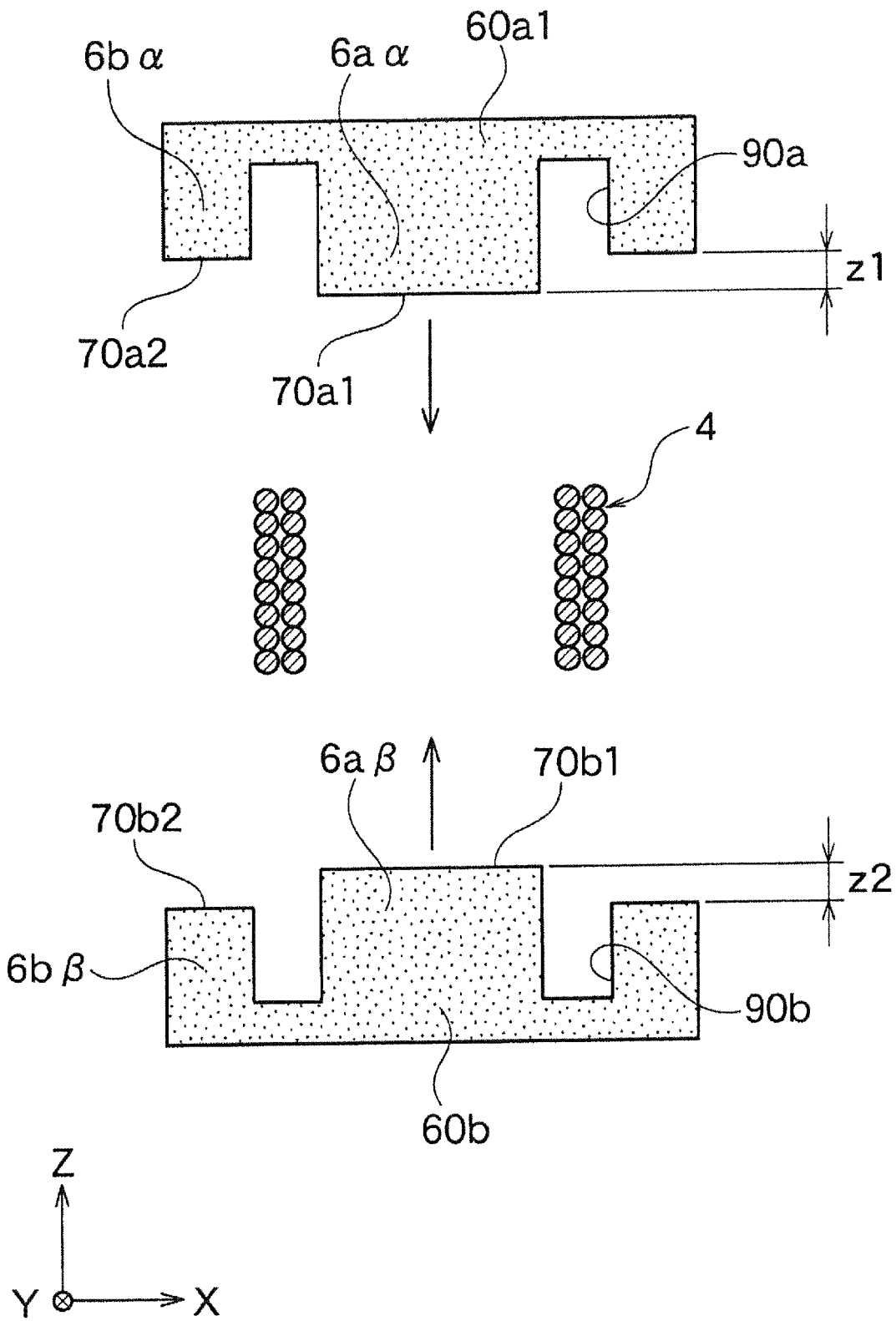
FIG. 3 is a cross-sectional view along the III-III line shown in FIG. 2.

Next, a method of manufacturing the inductor element 2 shown in FIG. 1 is described using FIG. 2 and FIG. 3.

The inductor element 2 manufactured by the method according to an embodiment of the present invention is manufactured by integrating two preliminary green compacts 60a and 60b and an insert member having the winding-wire portion 4 constituted by an air-core coil or so. Both ends of the conductor 5 constituting the winding-wire portion 4 are drawn as lead portions 5a and 5b toward outside the winding-wire portion 4. Terminals (not shown) may be connected with the lead portions 5a and 5b after a main compression or may previously be connected with the lead portions 5a and 5b before a main compression.

Joint projected surfaces 70a and 70b are respectively formed on the preliminary green compacts 60a and 60b and are configured to be abutted and joined with each other. The joint projected surfaces 70a and 70b respectively include housing concave portions 90a and 90b for housing an upper half and a lower half of the winding portion 4. The housing concave portions 90a and 90b have a size where inner and outer circumferences and ends of the winding portion 4 as an insert member in the winding axis direction can contact with and enter the housing concave portions 90a and 90b.

Either or both of the joint projected surfaces 70a and 70b includes(s) leading grooves 80 for leading the lead portions 5a and 5b to the outside of the core portion 6. Incidentally, FIG. 2 illustrates a pair of lead portions 5a and 5b, but FIG. 3 does not illustrate the pair of lead portions 5a and 5b.

As shown in FIG. 3, prepared is a preliminary green compact 60a where an inner core part $60a\alpha$ is higher than an outer circumferential part $60b\alpha$ by "z1", and similarly prepared is a preliminary green compact 60b where an inner core part $60\alpha\beta$ is higher than an outer circumferential part $60b\beta$ by "z2".

When a main compression is carried out using the preliminary green compacts 60a and 60b, the amount of the magnetic powder in the inner core parts $60a\alpha$ and $60a\beta$ is larger than the amount of the magnetic powder in the outer circumferential parts $60b\alpha$ and $60b\beta$, and large is the density of the magnetic powder in the inner core part 6a shown in FIG. 1 (the inner-core central region $6\alpha$ shown in FIG. 1).

Incidentally, there is no limit to the magnitude correlation of "z1" and "z2". That is, z1=z2 may be satisfied, z1>z2 may be satisfied, and z1<z2 may be satisfied. Moreover, "z1" or "z2" may be zero.

The lengths of the inner circumferential parts $60a\alpha$ and $60a\beta$ in the Z-axis direction are larger than the lengths of the outer circumferential parts $60b\alpha$ and $60b\beta$ in the Z-axis direction as shown in FIG. 3, and the inner core part 6a shown in FIG. 1 (the inner-core central region 6α shown in FIG. 1) is thereby compressed more strongly than the outer circumferential part 6b.

In manufacturing the inductor element 2 according to the present embodiment, firstly produced are granules to be a raw material of the preliminary green compacts 60a and 60b. The granules are produced by any method. For example, the granules can be produced by adding a resin to a magnetic powder and stirring and drying it.

The magnetic powder has any particle size. For example, the magnetic powder has an average particle size of 0.5 to 50 μm. Examples of the resin include epoxy resin, phenol resin, polyimide, polyamide imide, silicone resin, and a combination of them. An insulating film may be formed on the surface of the magnetic powder before mixing the magnetic powder and the resin. For example, an insulating film of $SiO_2$ film can be formed by sol-gel method.

Coarse granules may be removed by adding the resin to the magnetic powder, stirring it, and passing it through a mesh. The resin may be diluted with a solvent when added to the magnetic powder. The solvent is ketones, for example.

The amount of the resin is not limited, but is preferably 1.0 to 6.0 wt % with respect to 100 wt % of the magnetic powder. When the amount of the resin is appropriate, the joint projected surfaces 70a and 70b are easily joined during a main compression mentioned below. The larger the amount of the resin is, the smaller the density of the magnetic powder is, and the smaller Sα and Sβ tend to be.

The preliminary green compacts 60a and 60b are manufactured in such a manner that the granules containing the magnetic powder and the resin are filled in a die cavity and compressed preliminarily. The preliminary compression is carried out at any pressure, but is preferably carried out at a pressure of $2.5 \times 10^2$ to $1 \times 10^3$ MPa (2.5 to 10 t/cm$^2$). The preliminary green compacts 60a and 60b have any density. For example, the preliminary green compacts 60a and 60b preferably have a density of 4.0 to 6.5 g/cm$^3$.

When the preliminary compression is carried out at a pressure of $2.5 \times 10^2$ to $1 \times 10^3$ MPa, prevented is/are a positional displacement of the winding portion 4 and/or a shape distortion of the wire generated after a main compression mentioned below, and it becomes easier to manufacture an inductor element excelling in all of withstand voltage, inductance, and DC superposition characteristics. When the densities of the preliminary green compacts 60a and 60b are in the above mentioned range (particularly 4.0 g/cm$^3$ or more), Sα and Sβ mentioned above become high easily. When the densities of the preliminary green compacts 60a and 60b are 6.5 g/cm$^3$ or less, a pressure during the preliminary compression does not become too high, and it becomes easier to prevent generation of rust and molding cracks.

Next, the inductor element 2 is obtained by arranging the obtained preliminary green compacts 60a and 60b and insert member in another die cavity that is different from the die cavity in the manufacture of the preliminary green compacts 60a and 60b as shown in FIG. 2 and FIG. 3 and carrying out a main compression (crimping). The main compression is carried out at any pressure, but is preferably carried out, for example, at a pressure of $1 \times 10^2$ to $8 \times 10^2$ MPa (1 to 8 t/cm$^2$). The pressure during the main compression is lower than the pressure during the preliminary compression (100%). The pressure during the main compression is preferably about 40 to 80%, more preferably about 50 to 60%, of the pressure during the preliminary compression (100%). When the pressure during the main compression is lower than the pressure during preliminary compression, it becomes easier to prevent a positional displacement of the winding portion 4 and/or a shape distortion of the wire generated after the main compression. The larger the pressure during the preliminary compression is than the pressure during the main compression, the more easily withstand voltage characteristics tend to improve.

Preferably, the resin is completely hardened by heating the inductor element 2 taken out from the die after the main compression. Specifically, the resin is preferably completely hardened by heating the inductor element 2, which has been taken out from the die, at a temperature that is higher than a temperature where the resin begins to be hardened.

In the inductor element 2 manufactured by the above-mentioned method, a positional displacement of the winding portion 4 and/or a shape distortion of the wire is/are small, and the core portion 6, particularly the inner-core central region 6α, can be formed densely. Thus, withstand voltage can also be improved while inductance and DC superposition characteristics are improved.

In the present embodiment, the inner core part of the core portion 6 of the inductor element 2 to be finally obtained can be manufactured densely. As a result, inductance and DC superposition characteristics can be improved more than those of conventional inductor elements.

Figure 4:
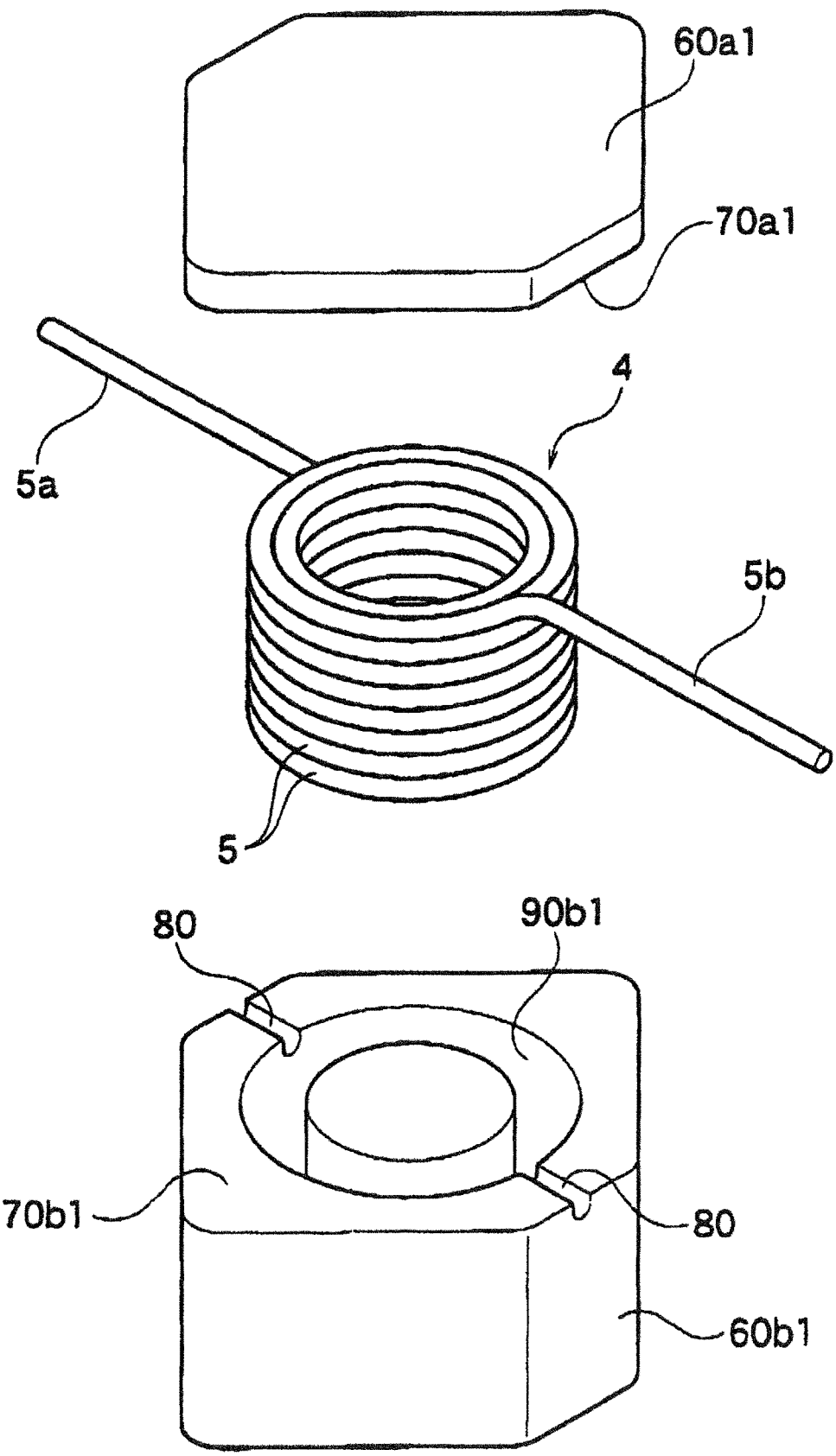
FIG. 4 is a perspective view of a preliminary green compact and an insert member used in a manufacturing process of an inductor element according to another embodiment of the present invention.
Figure 5:
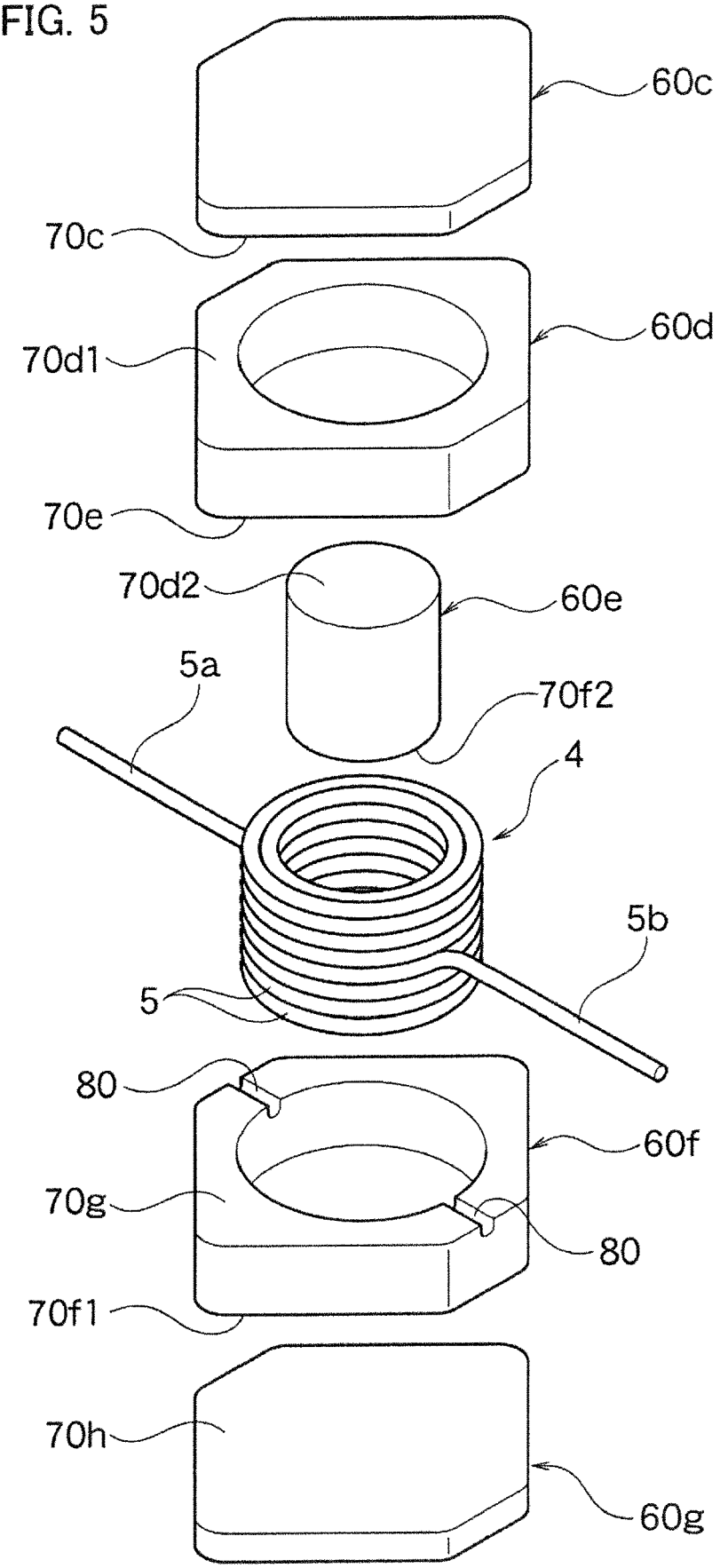
FIG. 5 is a perspective view of a preliminary green compact and an insert member used in a manufacturing process of an inductor element according to another embodiment of the present invention.
Figure 6:
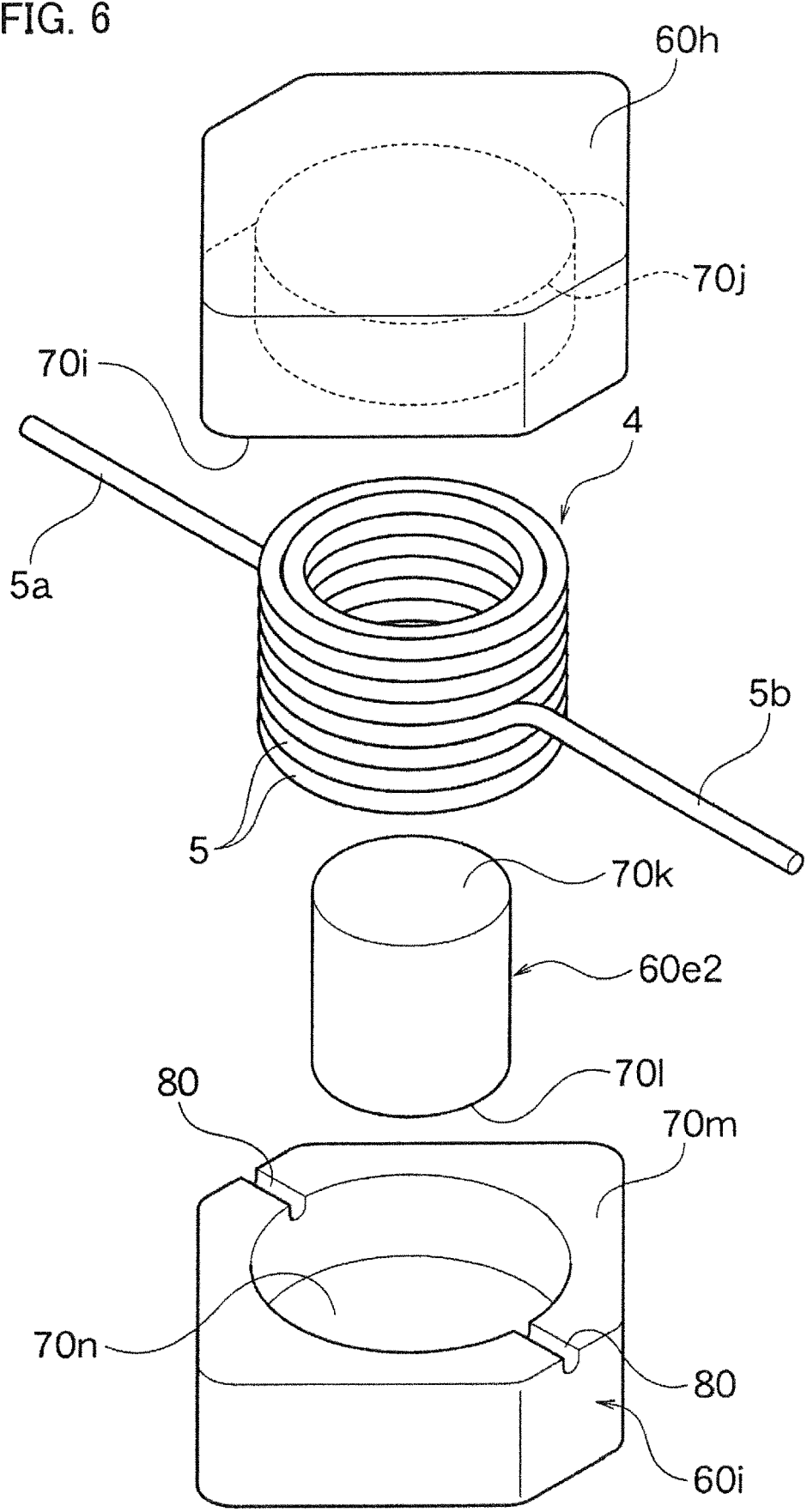
FIG. 6 is a perspective view of a preliminary green compact and an insert member used in a manufacturing process of an inductor element according to another embodiment of the present invention.

In addition to the method shown in FIG. 2 and FIG. 3, the inductor element 2 according to the present embodiment is manufactured by, for example, a method of preparing a flat preliminary green compact 60a1 and a pot preliminary green compact 60b1 as shown in FIG. 4. At this time, the inner core part of the pot preliminary green compact 60b1 may be higher than the outer circumferential part. Moreover, as shown in FIG. 5, the inductor element 2 according to the present embodiment is manufactured by preparing plate preliminary green compacts 60c and 60e, ring preliminary green compacts 60d and 60f, and a cylindrical preliminary green compact 60e. At this time, the cylindrical preliminary green compact 60e2 may be higher than the coil 5. Moreover, as shown in FIG. 6, the inductor element 2 according to the present embodiment is manufactured by preparing three preliminary green compacts 60e2, 60h, and 60i. At this time, the cylindrical preliminary green compact 60e may be higher than the coil 5. The shapes of the preliminary green compacts are not limited to the shapes shown in FIG. 6 to FIG. 8, and should be determined so that the inductor element 2 to be finally obtained has the shape shown in FIG. 1, and that the inner-core central region 6α has a high density. The larger the number of preliminary green compacts is, the better DC superposition characteristics tend to improve.

Incidentally, the present invention is not limited to the above-mentioned embodiments and may be changed variously within the scope of the present invention.

EXAMPLES

Hereinafter, the present invention is described based on more detailed Examples, but is not limited thereto.

Examples 1 to 3

In Examples 1 to 3, preliminary green compacts having the shapes in FIG. 2 and FIG. 3 were manufactured by preliminary compression and were then subjected to a main compression, and an inductor element having the shape shown in FIG. 1 was obtained.

First, granules to be filled in a die cavity were prepared. A spherical Fe—Si alloy (average particle size: 25 μm) was prepared as a magnetic powder, and an insulating film of SiO$_2$ by sol-gel method was formed on the surface of the magnetic powder. The magnetic powder was added with 3 wt % of an epoxy resin diluted into acetone with respect to 100 wt % of the magnetic powder and was stirred. After the stirring, the stirred material was passed through a mesh whose size was 250 μm and dried at room temperature for 24 hours, and the granules to be filled in a die cavity were obtained.

The granules were filled in a die cavity and subjected to a preliminary compression, and two preliminary green compacts having the shapes in FIG. 2 and FIG. 3 were manufactured. In the present example, the two preliminary green compacts had the same shape. The pressure during the preliminary compression was 6×10$^2$ MPa. At this time, "z1" (="z2") was changed in each of Examples 1 to 3.

Next, the manufactured preliminary green compacts and an insert member were arranged in another die cavity that was different from the die used in the preliminary compression. The two preliminary green compacts shown in FIG. 2 and FIG. 3 and an insert member having a winding-wire portion whose inner diameter was 4 mm and height was 3 mm were arranged in the cavity as shown in FIG. 2 and FIG. 3.

Next, a main compression was carried out by pressurization from top and bottom in the Z-axis direction in FIG. 3. The main compression was carried out at 1×10$^2$ MPa.

Thereafter, the green compacts were taken out from the die and heated for 1 hour at 180° C., which was higher than the temperature (110° C.) where the epoxy resin began to be hardened, and the epoxy resin was hardened, whereby samples of inductor elements of each example shown in Table 1 were obtained. The size of the obtained core portion was length 7 mm×width 7 mm×height 5.4 mm.

Measured were Sα and Sβ of the samples of the inductor elements thus obtained. Specifically, Sα and Sβ were calculated by observation of a SEM image of 480 μm×560 μm at each measurement point. The measurement points were determined in such a manner that center points of the measurement points were considered to be points on the winding axis center 4α that were respectively located 0.24 mm, 0.74 mm, 1.64 mm, 2.14 mm, 2.64 mm, 3.14 mm, 3.64 mm, 4.54 mm, and 4.84 mm away from one of surfaces of the inductor element through which the winding axis center 4α passed. Then, an area ratio of the magnetic powder at each of the measurement points was calculated and shown in Table 1. Sβ was determined as an average of the area ratios of the magnetic powder at four measurement points that were respectively located 0.24 mm, 0.74 mm, 4.54 mm, and 4.84 mm away from one of surfaces of the inductor element mentioned above. Sα was determined as an average of the area ratios of the magnetic powder at five measurement points that were respectively located 1.64 mm, 2.14 mm, 2.64 mm, 3.14 mm, and 3.64 mm away from one of surfaces of the inductor element mentioned above.

Moreover, inductance L$_0$ of each inductor element was measured.

Inductance was measured using an LCR meter (manufactured by Hewlett-Packard Co., Ltd.). In this measurement, the measurement frequency was 100 KHz, and the measurement voltage was 0.5 mV. An inductance L$_0$ of 47.0 to 56.4 μH was considered to be good.

In the measurement of DC superposition characteristics, DC current was applied from zero to the samples of each inductor element, and DC superposition characteristics were evaluated by Isat, which was determined as a current value (ampere) that flowed when inductance (μH) was decreased to 80% of inductance at zero current. When Isat was 6.0 A or more, DC superposition characteristics were considered to be good.

Figure 7:
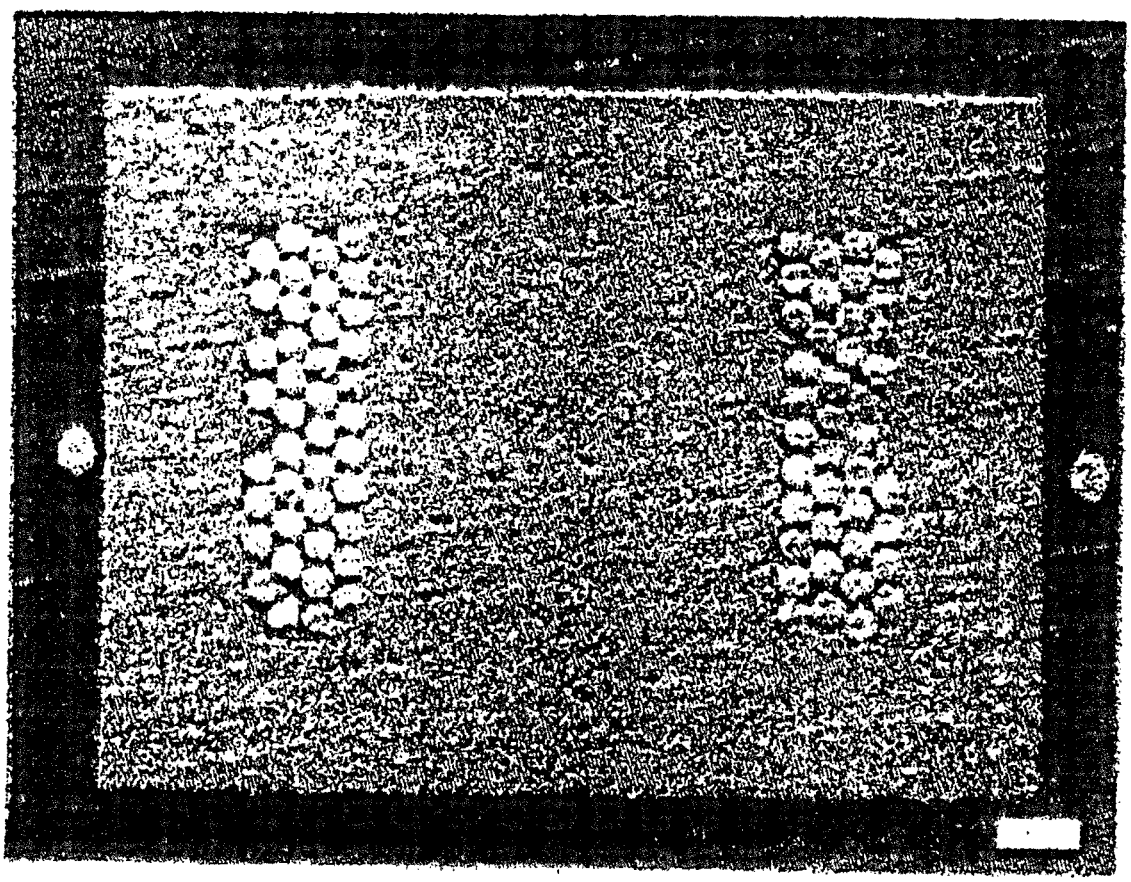
FIG. 7 is a cross-sectional photograph of the inductor element of Example 1 of the present application.
Figure 11:
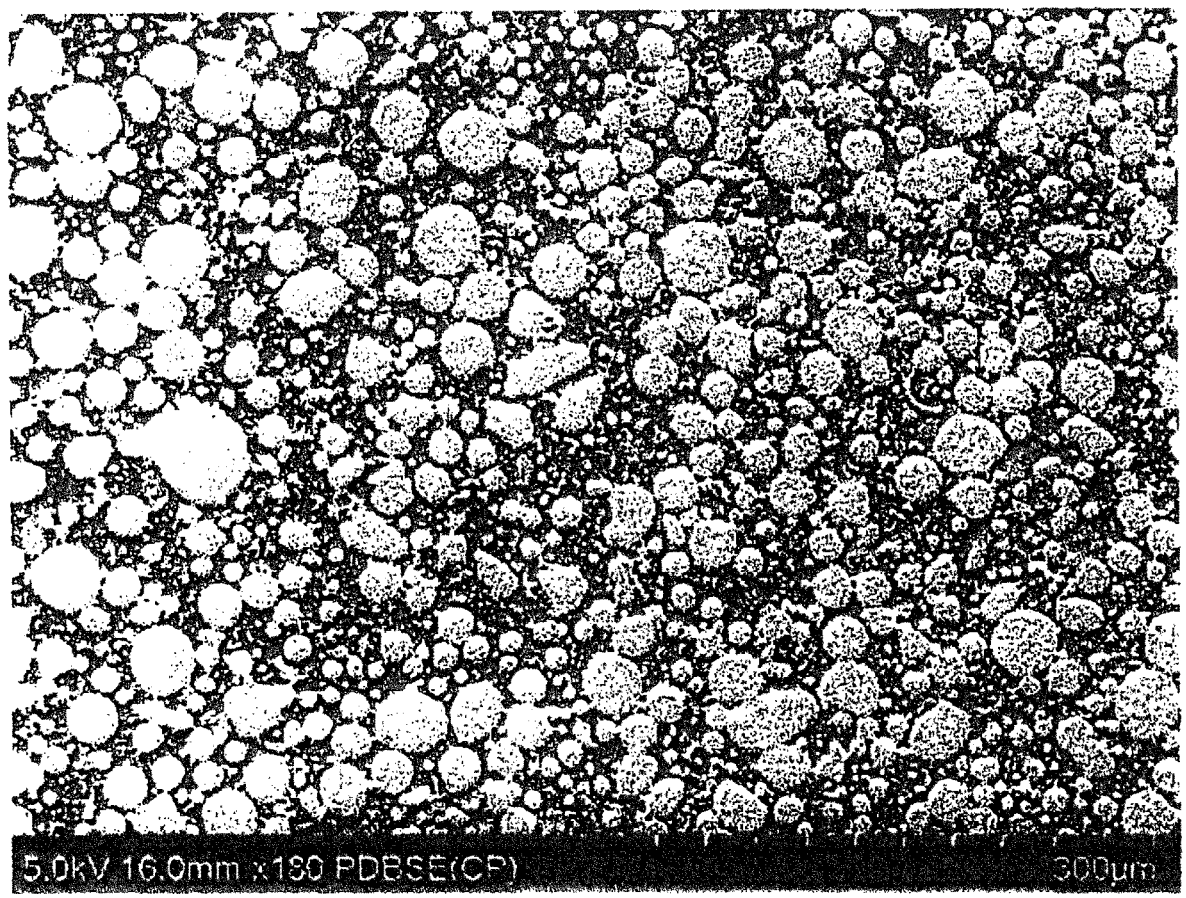
FIG. 11 is a SEM image of an inner-core central region of Example 1 of the present application.

Moreover, a cross sectional photograph of the sample of the inductor element of Example 1 was taken and shown in FIG. 7. Moreover, FIG. 11 shows a SEM image of the inner-core central region of Example 1.

Comparative Examples 1 to 3

Figure 12:
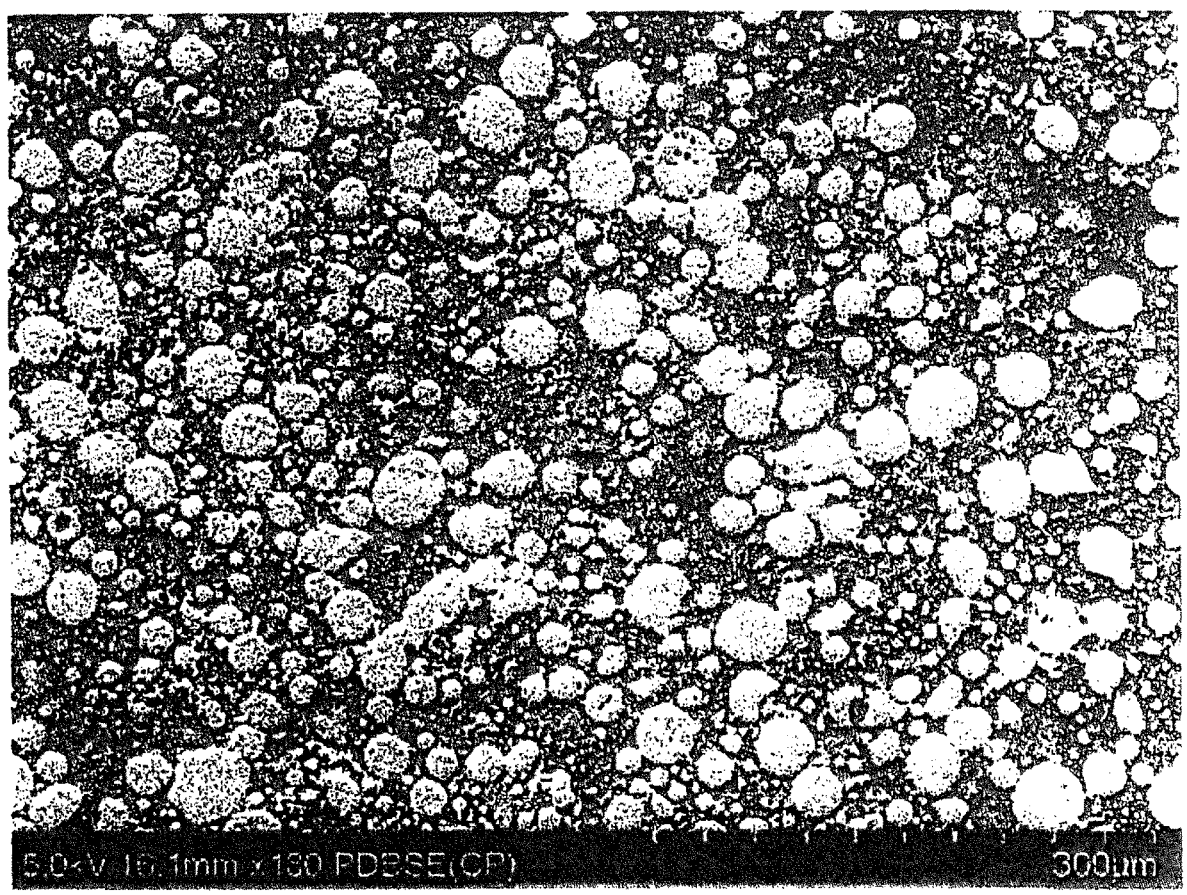
FIG. 12 is a SEM image of an inner-core central region of Comparative Example 3 of the present application.

In Comparative Examples 1 to 3, granules were manufactured similarly to Examples 1 to 3, an insert member was disposed in a die cavity for main compression, the granules were filled in the die cavity, and a main compression was carried out without preliminary compression. Inductor elements of Comparative Examples 1 to 3 were manufactured similarly to those of Examples 1 to 3 except that the main compression was carried out without preliminary compression. That is, all of Comparative Examples 1 to 3 were obtained with the same conditions, and their test results were uneven. Table 1 shows the results. Moreover, FIG. 12 shows a SEM image of the inner-core central region of the inductor element of Comparative Example 3.

Figure 8:
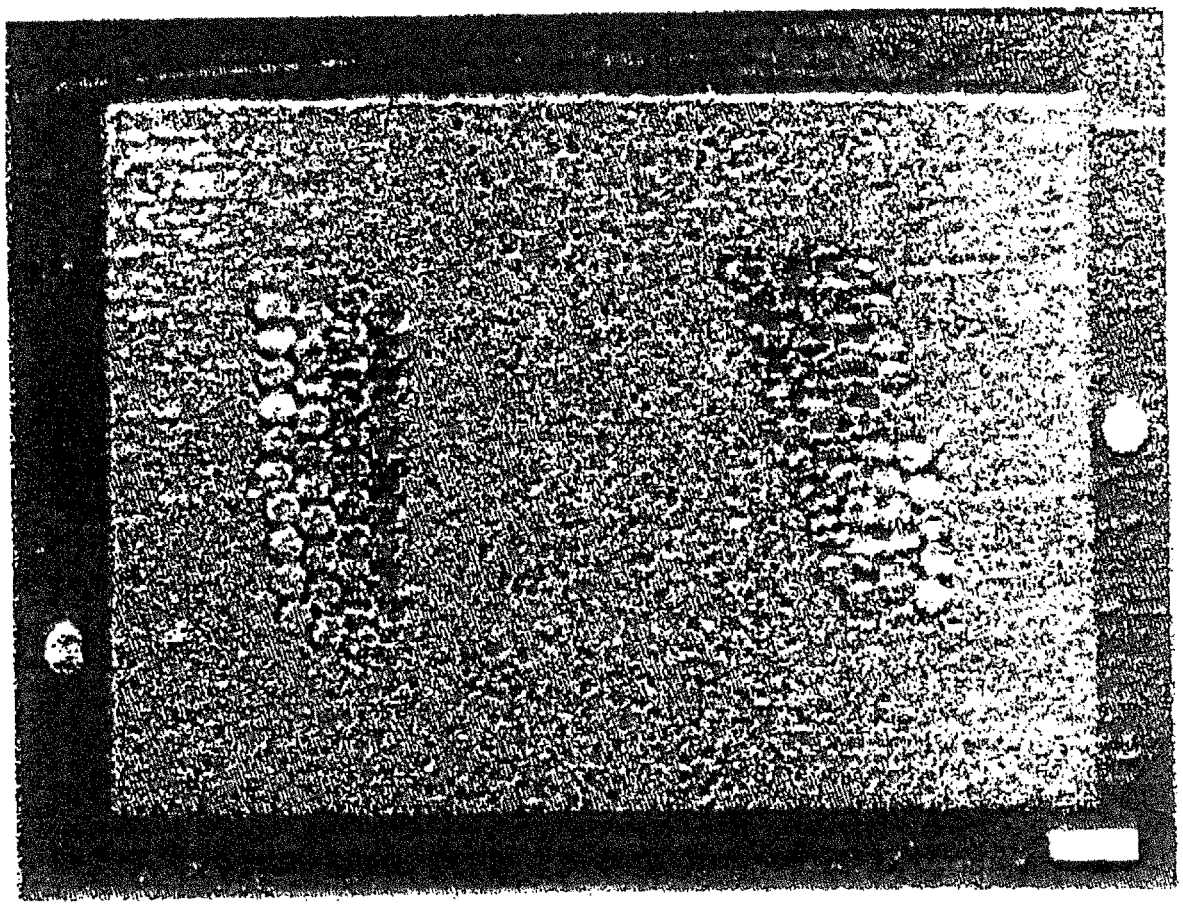
FIG. 8 is a cross-sectional photograph of the inductor element of Comparative Example 3 of the present application.

Moreover, a cross-sectional photograph of the sample of the inductor element of Comparative Example 3 was taken and shown in FIG. 8.

TABLE 1

| | | z1 | L$_0$ | Isat | \multicolumn{9}{c|}{area ratio of metal powder [%]} | | | |
| | | | | | \multicolumn{9}{c|}{distance from top surface (center point of measurement region) [mm]} | | | Sα− |
| | method | [mm] | [μH] | [A] | 0.24 | 0.74 | 1.64 | 2.14 | 2.64 | 3.14 | 3.64 | 4.54 | 4.84 | Sα | Sβ | Sβ |
|---|---|---|---|---|---|---|---|---|---|---|---|---|---|---|---|---|
| EX. 1 | preliminary compression/ main compression | 0.60 | 50.00 | 7.20 | 71.1 | 71.6 | 74.6 | 71.5 | 72.1 | 69.8 | 71.4 | 67.8 | 61.7 | 71.9 | 68.1 | 3.8 |
| EX. 2 | preliminary compression/ main compression | 0.40 | 49.15 | 6.82 | 70.8 | 69.8 | 69.7 | 68.7 | 69.7 | 70.5 | 66.8 | 66.6 | 61.9 | 69.1 | 67.3 | 1.8 |
| EX. 3 | preliminary compression/ main compression | 0.20 | 48.51 | 6.39 | 70.0 | 67.7 | 65.8 | 66.6 | 65.6 | 64.7 | 64.7 | 65.5 | 62.5 | 65.5 | 66.4 | −0.9 |
| COMP. | no preliminary | — | 46.48 | 5.86 | 69.0 | 70.9 | 65.8 | 57.6 | 59.7 | 61.5 | 68.0 | 64.7 | 61.6 | 62.5 | 66.6 | −4.0 |

TABLE 1-continued

| | | | | | area ratio of metal powder [%] | | | | | | | | | | | |
| --- | --- | --- | --- | --- | --- | --- | --- | --- | --- | --- | --- | --- | --- | --- | --- | --- |
| | | zl | $L_0$ | Isat | distance from top surface (center point of measurement region) [mm] | | | | | | | | | | | Sα- |
| | method | [mm] | [µH] | [A] | 0.24 | 0.74 | 1.64 | 2.14 | 2.64 | 3.14 | 3.64 | 4.54 | 4.84 | Sα | Sβ | Sβ |
| EX. 1 | compression | | | | | | | | | | | | | | | |
| COMP. EX. 2 | no preliminary compression | — | 45.86 | 5.63 | 67.2 | 67.1 | 65.6 | 62.9 | 61.3 | 61.4 | 54.2 | 64.0 | 64.5 | 61.1 | 65.7 | −4.6 |
| COMP. EX. 3 | no preliminary compression | — | 45.14 | 5.44 | 70.9 | 64.5 | 61.5 | 61.4 | 62.9 | 57.7 | 57.6 | 64.4 | 64.0 | 60.2 | 66.0 | −5.7 |

According to Table 1, FIG. 11, and FIG. 12, the density of the inner-core central region was higher than the density of the top-plate central regions in Example 1 of the present application. On the other hand, the density of the top-plate central regions was higher than the density of the inner-core central region in Comparative Example 3 of the present application. Moreover, when FIG. 7 and FIG. 8 were compared, the inductor element of Example 1 of the present application had a smaller distortion than the inductor element of Comparative Example 3 of the present application.

According to Table 1, Examples 1 to 3 of the present application, where Sα–Sβ was −2.0% or more, had better inductance and DC superposition characteristics than those of Comparative Examples 1 to 3 of the present application, where Sα–Sβ was less than −2.0%, and Examples 1 to 3 of the present application, where Sα was 65% or more, were more excellent in DC superposition characteristics than Comparative Examples 1 to 3 of the present application, where Sα was less than 65%.

Examples 4 to 6 and Comparative Examples 4 to 6

Except that a Fe—Si—Cr alloy having an irregular shape (average particle size: 25 µm) was prepared as a magnetic powder, Examples 4 to 6 were produced with the same conditions as those of Examples 1 to 3, and Comparative Examples 4 to 6 were produced with the same conditions as those of Comparative Examples 1 to 3. Table 2 shows the results.

Characteristics of the inductor element to be obtained are changed due to change in material of the magnetic powder, and desired inductance and DC superposition characteristics are changed. Thus, unlike Examples 1 to 3 and Comparative Examples 1 to 3, an inductance $L_0$ of 52.0 to 56.4 µH was considered to be good, and an Isat of 3.5 A or more was considered to be good, in Examples 4 to 6 and Comparative Examples 4 to 6.

Figure 9:
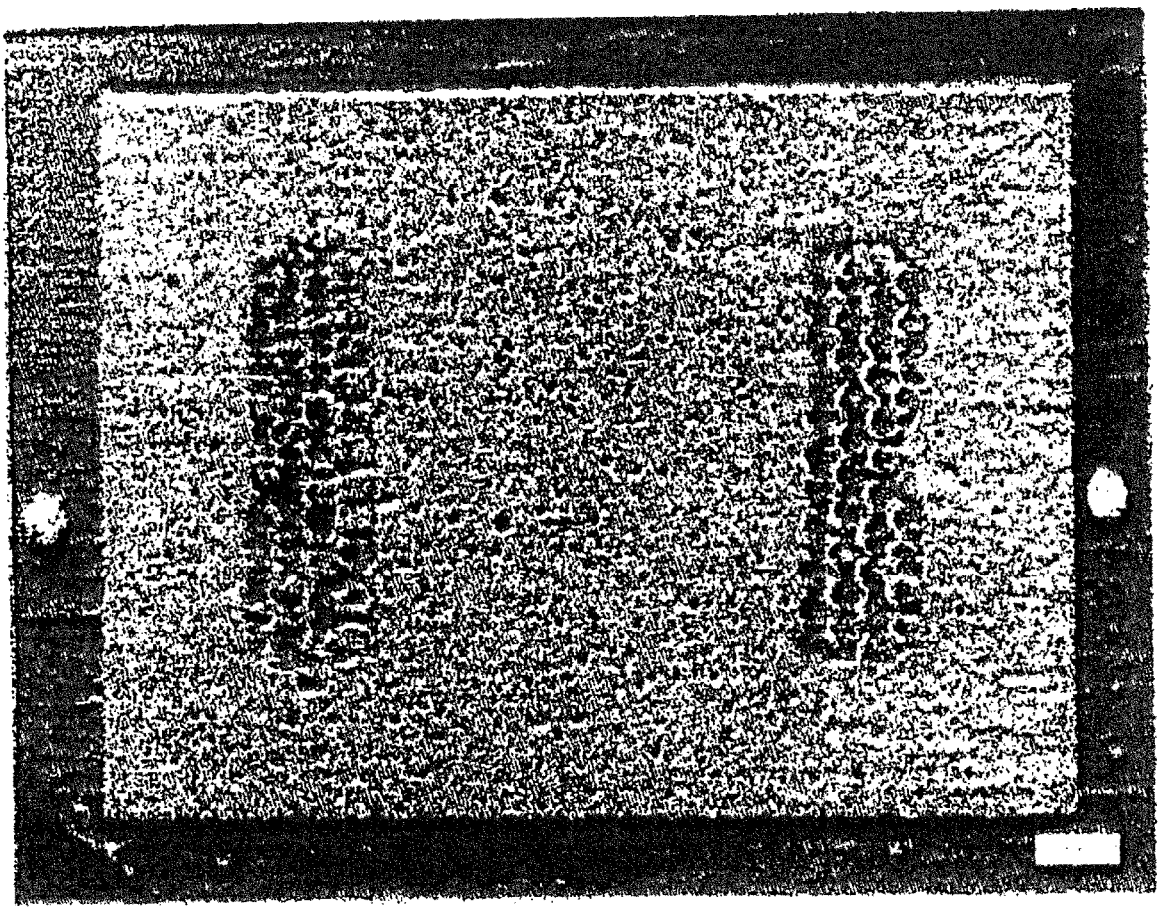
FIG. 9 is a cross-sectional photograph of the inductor element of Example 4 of the present application.
Figure 10:
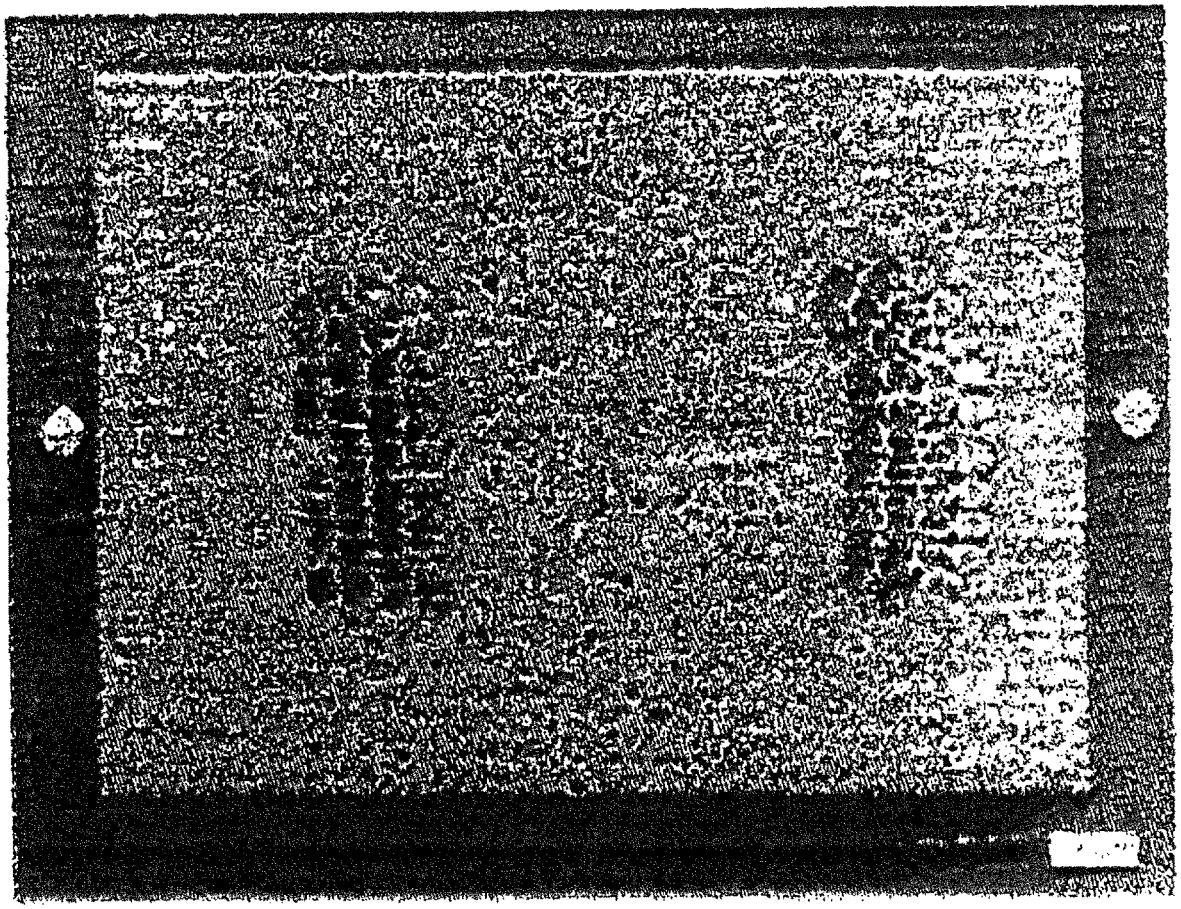
FIG. 10 is a cross-sectional photograph of the inductor element of Comparative Example 5 of the present application.
Figure 13:
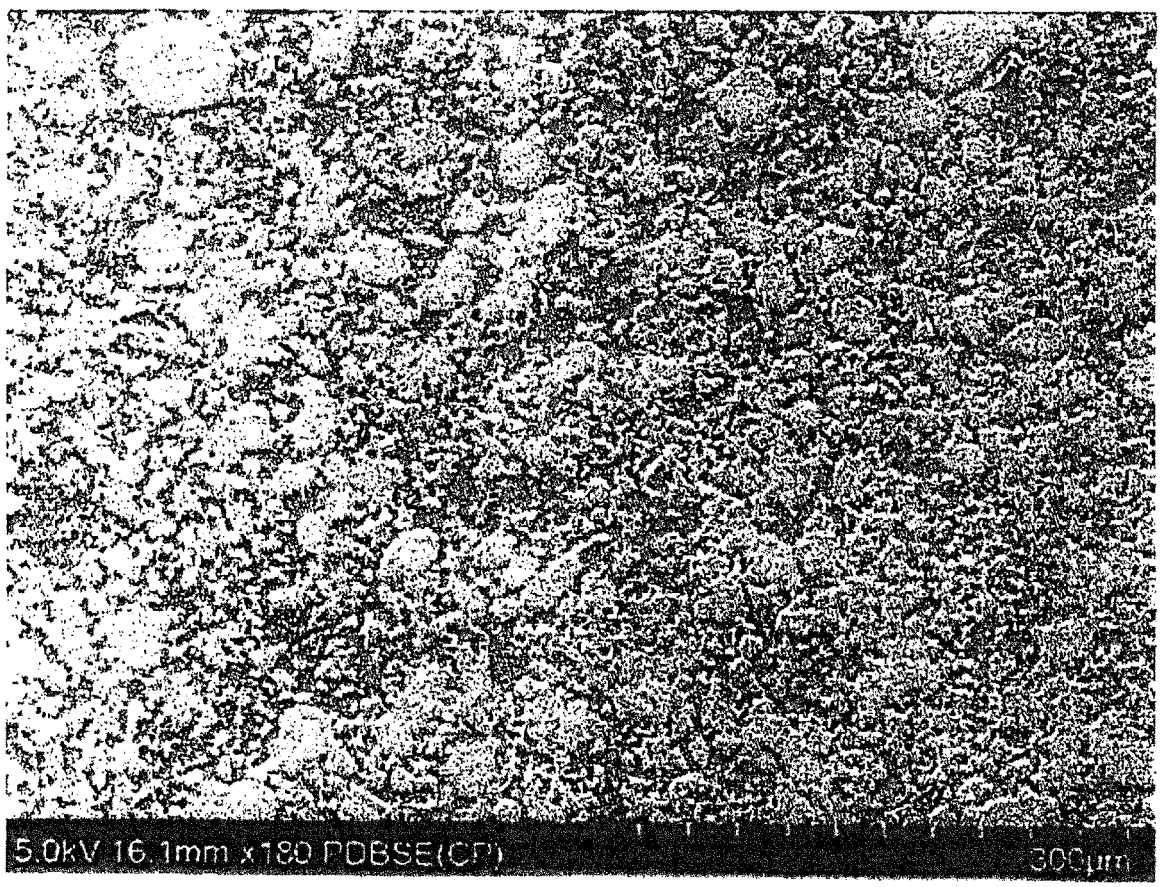
FIG. 13 is a SEM image of an inner-core central region of Example 4 of the present application.
Figure 14:
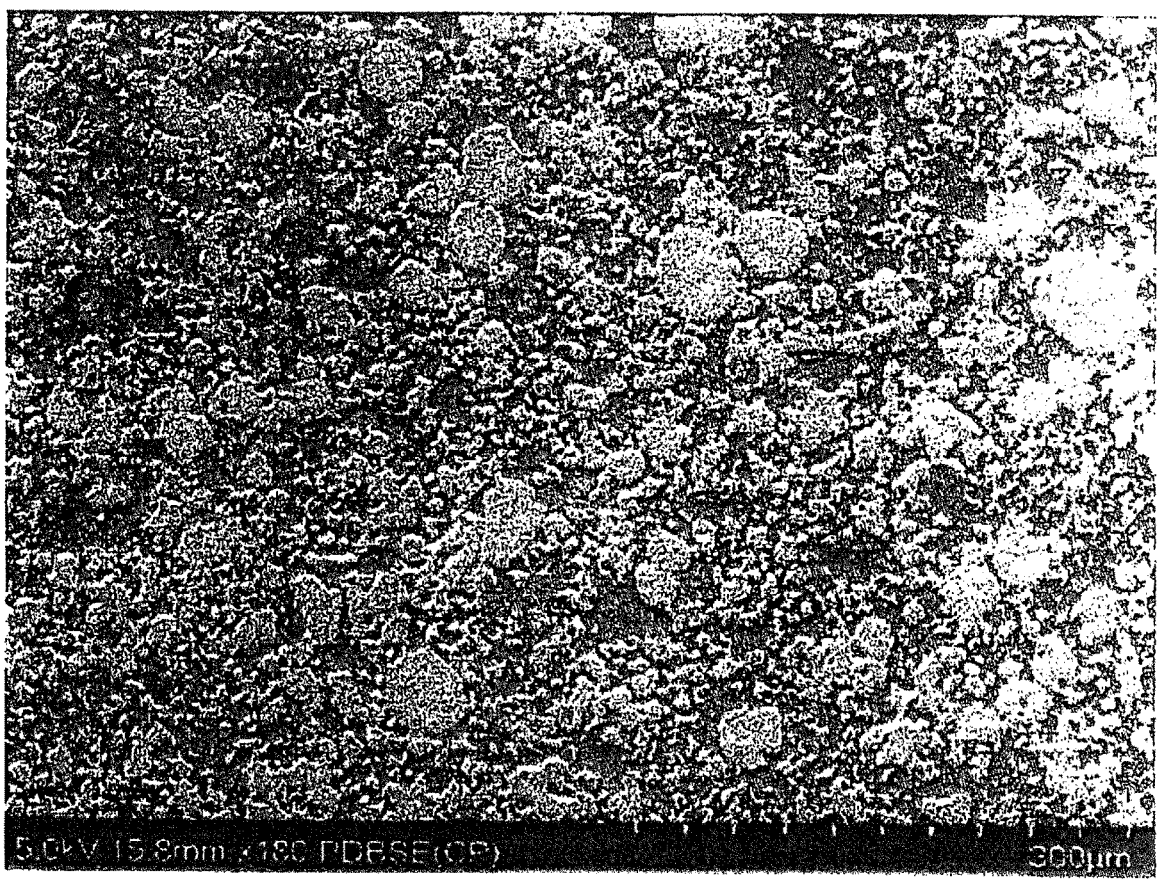
FIG. 14 is a SEM image of an inner-core central region of Comparative Example 5 of the present application.

A cross-sectional photograph of the sample of the inductor element of Example 4 was taken and shown in FIG. 9. A cross-sectional photograph of the sample of the inductor element of Comparative Example 5 was taken and shown in FIG. 10. Moreover, FIG. 12 shows a SEM image of the inner-core central region of Example 4, and FIG. 13 shows a SEM image of the inner-core central region of Comparative Example 5.

Examples 4 to 6 and Comparative Examples 4 to 6 show that a similar tendency to the tendency of the magnetic powder of Fe—Si alloy was exhibited even in the magnetic powder of Fe—Si—Cr alloy.

NUMERICAL REFERENCES 2, 2A . . . inductor element
4 . . . winding-wire portion
4α . . . winding axis center
5 . . . conductor
6 . . . core portion
6a . . . inner circumferential part

TABLE 2

| | | | | | area ratio of metal powder [%] | | | | | | | | | | | |
| --- | --- | --- | --- | --- | --- | --- | --- | --- | --- | --- | --- | --- | --- | --- | --- | --- |
| | | zl | $L_0$ | Isat | distance from top surface (center point of measurement region) [min] | | | | | | | | | | | Sα- |
| | method | [mm] | [µH] | [A] | 0.24 | 0.74 | 1.64 | 2.14 | 2.64 | 3.14 | 3.64 | 4.54 | 4.84 | Sα | Sβ | Sβ |
| EX. 4 | preliminary compression/ main compression | 0.60 | 54.82 | 4.00 | 70.0 | 70.0 | 72.0 | 70.6 | 67.3 | 70.0 | 70.7 | 69.3 | 66.7 | 70.1 | 69.0 | 1.1 |
| EX. 5 | preliminary compression/ main compression | 0.40 | 53.44 | 3.69 | 67.4 | 70.8 | 69.8 | 66.7 | 68.9 | 69.8 | 67.6 | 67.4 | 69.0 | 68.6 | 68.7 | −0.1 |
| EX. 6 | preliminary compression/ main compression | 0.20 | 52.05 | 3.52 | 67.8 | 71.6 | 63.6 | 66.7 | 64.5 | 65.7 | 66.6 | 66.3 | 63.7 | 65.4 | 67.4 | −1.9 |
| COMP EX. 4 | no preliminary compression | — | 51.18 | 2.83 | 68.7 | 67.7 | 64.5 | 62.0 | 61.7 | 64.5 | 64.6 | 66.8 | 64.5 | 63.5 | 66.9 | −3.5 |
| COMP EX. 5 | no preliminary compression | — | 50.40 | 2.76 | 63.6 | 65.3 | 61.2 | 61.2 | 63.4 | 57.0 | 61.4 | 63.7 | 66.8 | 60.8 | 64.9 | −4.0 |
| COMP EX. 6 | no preliminary compression | — | 49.52 | 2.63 | 66.1 | 63.0 | 56.6 | 56.2 | 60.2 | 60.4 | 60.4 | 64.3 | 62.3 | 58.8 | 63.9 | −5.2 |

6b . . . outer circumferential part
6α . . . inner-core central region
6β1 . . . top-plate central region
6β2 . . . top-plate central region
60a to 60k . . . preliminary green compact
70a to 70n . . . joint projected surface
80, 80a, 80b . . . leading groove
90a, 90b . . . housing concave portion

The invention claimed is:

1. An inductor element, comprising:
a wire-winding portion where a conductor is wound in a coil shape; and
a core portion surrounding the wire-winding portion and containing a magnetic powder and a resin,
wherein an inner-core central region is defined as a region of the core portion within a predetermined distance from a winding axis center of the wire-winding portion toward an existing region of the wire-winding portion in an outward direction perpendicular to the winding axis center,
wherein a top-plate central region is defined as a region of the core portion within a predetermined distance from the winding axis center toward a no-existing region of the wire-winding portion in the outward direction,
wherein $S\alpha - S\beta \geq -2\%$ is satisfied, where $S\alpha$ (%) is a ratio of an area occupied by the magnetic powder in the inner-core central region, and $S\beta$ (%) is a ratio of an area occupied by the magnetic powder in the top-plate central region, on a cross section of the inductor element passing the winding axis center and parallel thereto, and
wherein an area ratio of the magnetic powder changes gradually in a continuous manner from the top-plate central region to the inner-core central region.

2. The inductor element according to claim 1, wherein $S\alpha - S\beta \geq -1\%$ is satisfied.

3. The inductor element according to claim 1, wherein $S\alpha - S\beta \geq 0\%$ is satisfied.

4. The inductor element according to claim 2, wherein $S\alpha - S\beta \geq 0\%$ is satisfied.

5. The inductor element according to claim 1, wherein $S\alpha \geq 65\%$ is satisfied.

6. The inductor element according to claim 2, wherein $S\alpha \geq 65\%$ is satisfied.

7. The inductor element according to claim 3, wherein $S\alpha \geq 65\%$ is satisfied.

8. The inductor element according to claim 4, wherein $S\alpha \geq 65\%$ is satisfied.

* * * * *